US007850116B2

(12) United States Patent
Stuhr

(10) Patent No.: US 7,850,116 B2
(45) Date of Patent: Dec. 14, 2010

(54) DUCTED OPEN ROTOR APPARATUS AND METHOD

(75) Inventor: Victor K. Stuhr, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1237 days.

(21) Appl. No.: 11/442,547

(22) Filed: May 26, 2006

(65) Prior Publication Data

US 2007/0272796 A1    Nov. 29, 2007

(51) Int. Cl.
B64D 27/00    (2006.01)
(52) U.S. Cl. ................ 244/54; 244/65; 244/53 B; 248/554; 60/904; 416/179; 416/189; 416/190
(58) Field of Classification Search ............... 244/54, 244/13, 65, 53 B, 12.3, 23 B, 23 C; 60/904; 248/554, 555; 416/129, 179, 189, 190, 244 R
See application file for complete search history.

(56) References Cited

U.S. PATENT DOCUMENTS

| | | | |
|---|---|---|---|
| 3,837,602 A | | 9/1974 | Mullins |
| 3,952,973 A | | 4/1976 | James |
| 4,043,522 A | * | 8/1977 | Vetter ................ 244/54 |
| 4,116,405 A | | 9/1978 | Bacchi et al. |
| 4,358,074 A | | 11/1982 | Schoen et al. |
| 4,437,627 A | | 3/1984 | Moorehead |
| 4,544,115 A | * | 10/1985 | Edgley ................ 244/54 |
| 4,569,199 A | | 2/1986 | Klees et al. |
| 4,657,209 A | | 4/1987 | Edgley |
| 4,817,382 A | | 4/1989 | Rudolph et al. |
| 4,917,336 A | | 4/1990 | Jacobs et al. |
| 5,452,575 A | | 9/1995 | Freid |
| 5,467,941 A | | 11/1995 | Chee |
| 5,943,856 A | | 8/1999 | Lillibridge et al. |

2005/0239940 A1    10/2005    Shima et al.

FOREIGN PATENT DOCUMENTS

WO    WO 90/09313    8/1990

OTHER PUBLICATIONS

"Performance Study of a Ducted Fan" by Abrego and Bulaga dated Jan. 2002.

(Continued)

*Primary Examiner*—J. Woodrow Eldred
(74) *Attorney, Agent, or Firm*—Harness, Dickey & Pierce, P.L.C.

(57) ABSTRACT

A propulsor apparatus for a mobile platform, for example an aircraft is provided. The propulsor apparatus includes an aerodynamically shaped propeller duct that houses at least a portion of a turboprop engine, and fully houses a propeller driven by the engine. Inside the propeller duct is a circumferential ring that closely surrounds the propeller such that only a small clearance is provided between the outermost tips of the propeller blades and an inner surface of the circumferential ring. The circumferential ring includes sound deadening material that attenuates noise generated by the tip vortices created at the outermost tips of the propeller blades. The propeller duct and circumferential ring are supported by a plurality of structural rods that couple to structure of the mobile platform, for example to the spars within a wing of an aircraft. The apparatus and method significantly reduces the noise associated with a turboprop engine.

18 Claims, 4 Drawing Sheets

OTHER PUBLICATIONS

National Advisory Committee for Aeronautics Technical Note 3547 titled "Aerodynamic Characteristics of a Small-Scale Shrouded Propeller at Angles of Attack from 0° to 90°" by Lysle P. Parlett dated Nov. 1955.

Smithsonian/NASA ADS Physics Abstract Service "An estimate of the noise shielding on the fuselage resulting from installing a short duct around an advanced propeller" by James H. Dittmar dated Mar. 1988.

AIAA 89-2478 "Ducted Ultra High Bypass Engine Configuration Definition" by H. Geidel and D. Gray dated Jul. 1989.

Glenn Technical Reports Server "Ultra-High Bypass Ration Jet Noise" by John K.C. Low dated Oct. 1994.

Glenn Technical Reports Server "Flow Analysis for the Nacelle of an Advanced Ducted Propeller at High Angle-of-Attack and at Cruise with Boundary Layer Control" by D.P. Hwang, D.R. Boldman, and C.E. Hughes dated Jan. 1994.

* cited by examiner

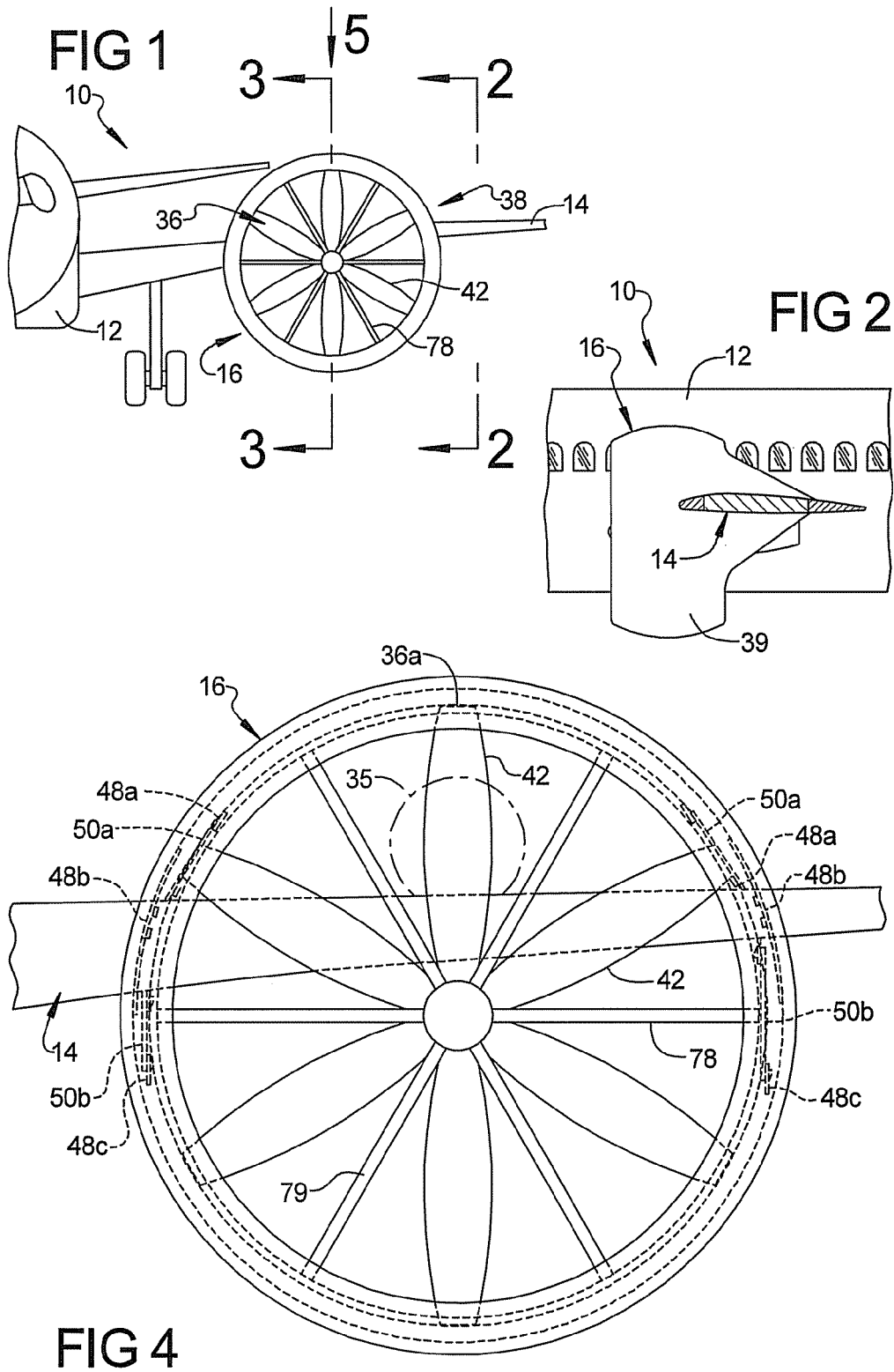

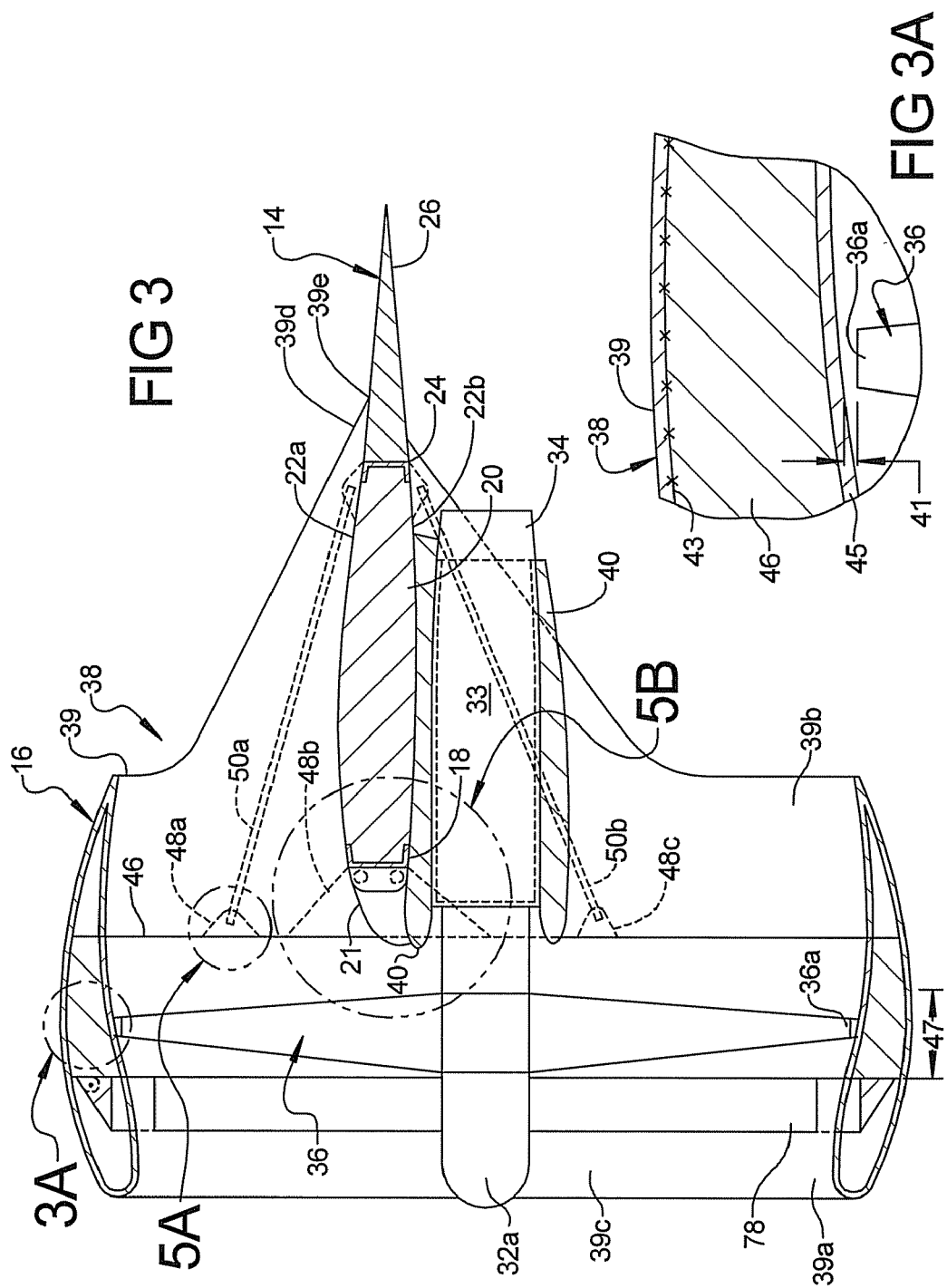

DUCTED OPEN ROTOR APPARATUS AND METHOD

FIELD

The present disclosure relates generally to engines used with various forms of aircraft. More particularly, the present disclosure relates to an engine for an aircraft, where the engine has a ducted propeller.

BACKGROUND

Over the years, performance demands on commercial transport aircraft has increased in the area of noise, fuel economy and reduced weight. Various technological advances continue to improve aircraft performance in each of the above mentioned areas. For example, continuous improvement in engines leads to better fuel economy. Even more, shifting from propeller powered systems to turbofans has led to quieter aircraft, while using more composite material in primary structures has yielded weight savings.

Today, however, there is increasing interest in going back to the use of turboprop engines from turbofan engines, especially for commercial transport aircraft applications. While significant strides have been made over the years to improve the fuel economy of turbofan engines, such engines still are not as fuel efficient as turboprop engines. On the other hand, while turboprop engines enjoy a fuel efficiency advantage over turbofan engines, turboprop engines generate higher noise levels during operation. Present day turboprop engines will not likely be able to meet the increasingly stringent noise level regulations that are expected to be enacted at airports around the world over the next several years. Thus, a challenge exists in providing a turboprop engine that generates less noise than present day turboprop engines.

The increased noise associated with turboprop engines is generally due to the propeller blade tips and the vortices associated with the blade tips. This increased noise impacts the communities surrounding an airport, as well as the ambient environment within the cabin of a commercial passenger transport aircraft. The increased noise is most noticeable during takeoff, when power is highest and altitude is lowest. When power input to the propeller of a turboprop engine is large, the thrust produced by the propeller is large, and the noise thus generated is commensurately greater.

Another drawback with turboprop engines is the speed disadvantage the turboprop engines suffer when compared to turbofan engines. In some instances, depending on the route being flown, this may not be a concern. For example, on shorter flight routes, the desired number of missions being flown per day may still be within the performance capabilities of an aircraft employing turboprop engines. However, on longer flight routes, the increased length of time needed for a given flight would likely be viewed negatively by paying passengers, if the aircraft was a commercial passenger transport aircraft.

What would be highly desirable is a new propulsive apparatus for powering transport aircraft that combines the benefits of better fuel economy of turboprop engines, with the reduced noise of a turbofan engine.

SUMMARY

In accordance with the present disclosure, a propulsor for a mobile platform is disclosed. In one implementation, the mobile platform is an aircraft, and the propulsor forms a turboprop engine having a propeller and associated duct structure that surrounds the propeller. In one aspect, a structure for securing the duct to a wing of an aircraft includes first laterally spaced mounts on the duct secured to a first spar of the wing, and at least one second mount secured to a second wing spar by means of a diagonal brace.

A principal advantage of the described embodiments is reducing noise from the propeller of the turboprop engine. Another advantage is that the duct that shrouds the propeller can be independently secured to the wing. Since the engine nacelle and the duct are independently secured to the aircraft wing, this allows all loads experienced by the duct to be transmitted directly to the wing spars. Because the engine nacelle does not support the duct, a lighter, slightly less robust engine nacelle may be used, which enables a weight savings to be achieved. Additionally, another advantage is that the duct helps to protect the fuselage of the aircraft against damage, if a propeller should fail.

Still another advantage is conveyed by using the duct to shroud the propeller. As the forward speed of a propeller-driven aircraft increases, rotational speed of the propeller also must increase. The propeller tip speed becomes a key factor in this progression when that speed nears Mach 1, the speed of sound. For the propeller tips operating in open air, large efficiency losses are encountered in this speed range, effectively limiting the maximum economical cruising speed of the aircraft. The presence of the duct around the propeller can be used to expand the incoming airflow, reducing its velocity as the propeller is encountered. This allows higher cruise speeds to be achieved without encountering the Mach problems described above.

Further areas of applicability of the present disclosure will become apparent from the detailed description provided hereinafter. It should be understood that the detailed description and specific examples, while indicating various embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a front view of an aircraft power plant installation apparatus in accordance with an embodiment of the present disclosure, as well as showing the apparatus being supported from a wing of an aircraft;

FIG. 2 is a side view of the aircraft power plant installation apparatus of FIG. 1 in accordance with directional arrow 2 in FIG. 1;

FIG. 3 is a cross-sectional side view of the aircraft power plant installation apparatus of FIG. 1 in accordance with section line 3-3 in FIG. 1;

FIG. 3A is an enlarged side view of the aircraft power plant installation apparatus in accordance with region 3A in FIG. 3;

FIG. 4 is an enlarged front view of the aircraft power plant installation apparatus of FIG. 1;

DETAILED DESCRIPTION

The following description of various embodiments is merely exemplary in nature and is in no way intended to limit the disclosure, its application, or uses.

In FIGS. 1 and 2, there is shown an aircraft 10 having a fuselage 12, two conventional wings 14 (only one of which is shown), and two wing mounted power plant installations or propulsor apparatuses 16 (again only one of which is shown).

Figure 5:
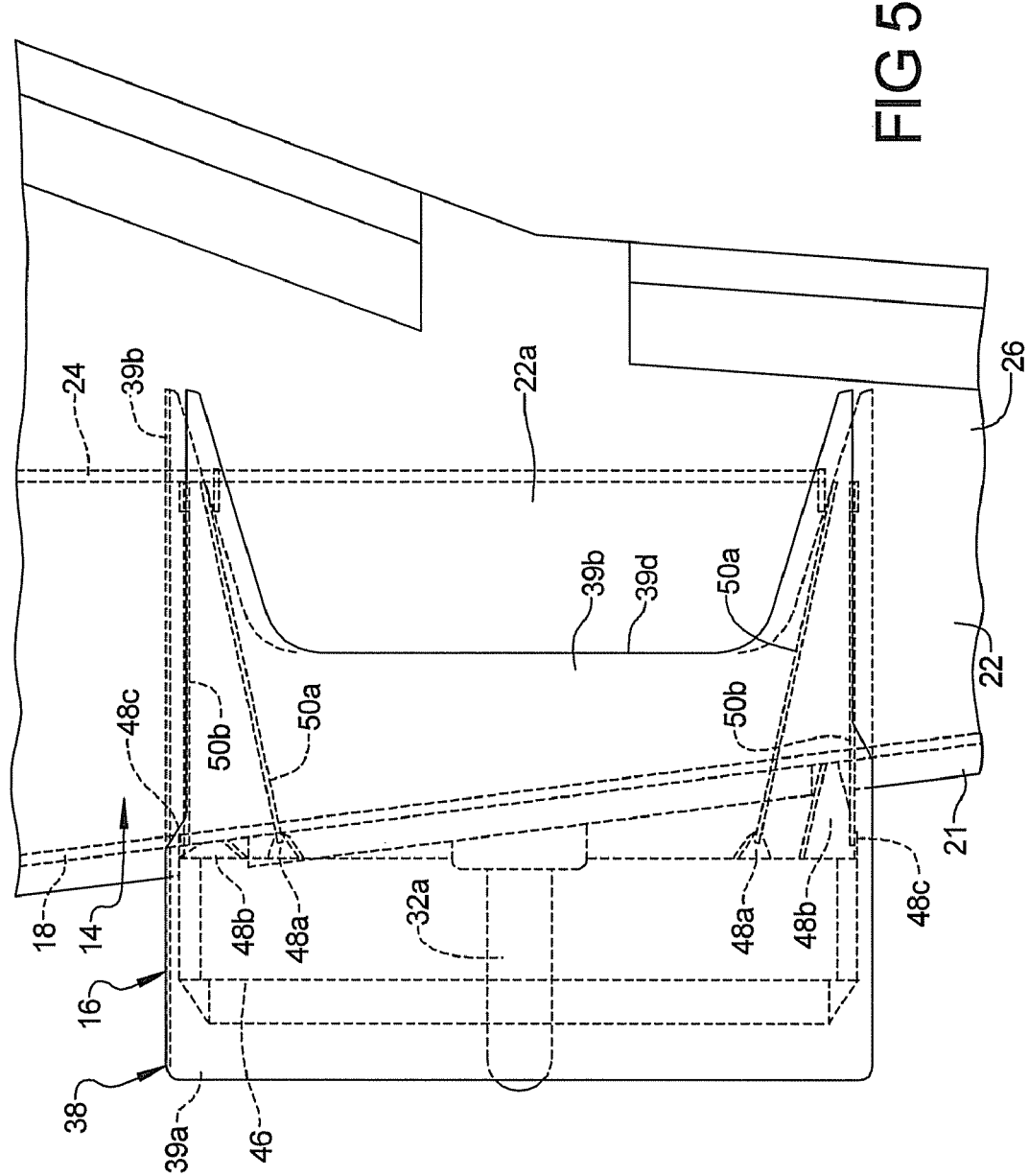
FIG. 5 is a top view in accordance with directional arrow 5 in FIG. 1 illustrating a plurality of structural tie rods of the aircraft power plant installation apparatus of FIG. 1.
Figure 5A:
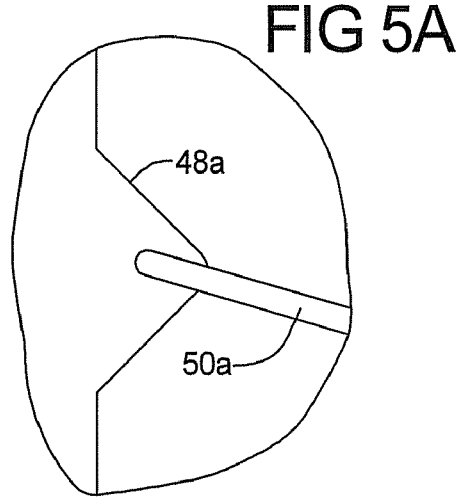
FIG. 5A is an enlarged side view of an exemplary structural tab or mount of a structural ring that is coupled to an aircraft wing via a structural rod in accordance with region 5A in FIG. 3.
Figure 5B:
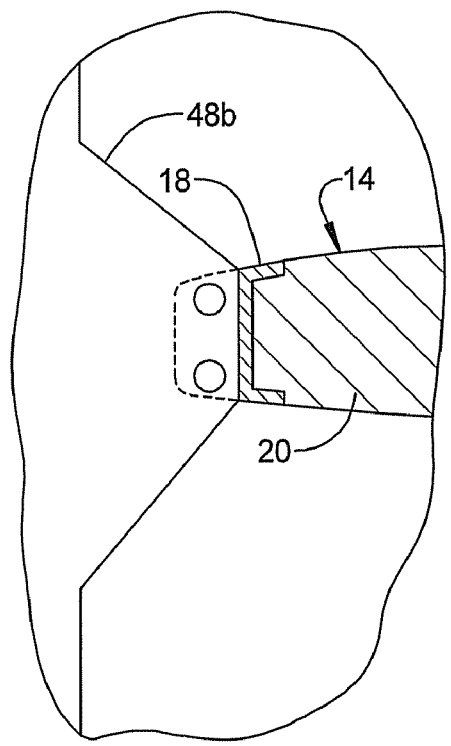
FIG. 5B is an enlarged side view of an exemplary structural tab of the structural ring that is coupled directly to the aircraft wing in accordance with region 5B in FIG. 3.

As shown in FIGS. 3 and 5, each wing 14 has a main front spar 18 that extends spanwise along the wing 14 and a structural rib 20 that extends chordwise along the wing 14. It is to be understood that the wing 14 includes a plurality of such ribs 20 spaced at suitable locations along the span of the wing 14. The front portion of the rib 20 is conventionally joined to the front spar 18. A leading edge panel 21 is conventionally affixed to the front spar 18 and is shaped to form the leading edge section of a conventional airfoil 22. Likewise, a rear portion of the rib 20 is conventionally joined to a rear spar 24. A rear edge panel 26 is conventionally affixed to the rear spar 24 and is shaped to form the rear edge section of the airfoil 22. The wing 14 has an upper airfoil surface skin 22a and a lower airfoil surface skin 22b that are affixed in a conventional manner to the front and rear spars 18, 24 and to the ribs 20.

Generally, as illustrated in FIG. 3, each propulsor apparatus 16 includes a typical power plant or turboprop engine 33, an engine nacelle 34, a propeller 36, and a propeller duct 38. The turboprop engine 33 has a longitudinal centerline axis and is generally coaxially disposed within the nacelle 34 and supported from its wing 14 by a conventional engine mounting device 40, such as a typical cowl. Although the aircraft 10 comprises a two-propulsor configuration, a multiple-propulsor configuration could be incorporated on the aircraft 10 as well. For example, if a four-propulsor configuration (not shown) is used, then each nacelle 34 may include two engines with their respective drive shafts connected in parallel in the drive train. The engine 33 and the engine nacelle 34 is typically mounted below the wing 14. However, referring to FIG. 4, the engine 33 and the engine nacelle 34 may be also mounted above the wing 14 as shown in phantom at 35.

Referring further to FIGS. 3 and 4, the propeller 36 is mounted on a drive shaft 32a that extends from the engine 33 in a conventional manner. The propeller 36 may comprise at least one single-rotating or counter-rotating propeller 36 having a desired diameter and a plurality of blades 42. The blades 42 have a common, predetermined length. For illustrative purposes only, a 6-blade propeller 36 is shown in FIGS. 1 and 4.

Again referring to FIGS. 3 and 5, the propeller duct 38 includes a housing 39 having an internally mounted structural ring 46 that shrouds the propeller 36. The propeller duct 38 reduces noise derived from propeller tips 36a and the related vortices existing at the propeller tips 36a. The propeller duct 38 is an independent structure from the engine nacelle 34 and has an aerodynamic surface. Additionally, the propeller duct 38 includes a plurality of diagonal rods 50 to couple the propeller duct 38 to the aircraft 10. The propeller duct 38 may be made from aluminum or any other suitably strong material typically used in airframe construction.

Performance requirements for weight and structure regarding most aircraft dictate that the propeller duct 38 is lightweight yet structurally strong. The propeller duct 38 must be capable of withstanding severe inertial loads, especially transverse loads that are exerted on the propeller duct 38 during normal flight of the aircraft 10. The inertial loads can be especially severe in turbulent flight conditions, and upon landing of the aircraft 10.

Referring further to FIGS. 3, 3A, 5A and 5, the housing 39 includes a forward portion 39a and an aft portion 39b, and an interior and an exterior surface extending longitudinally over and beneath the engine nacelle 34 and a portion of the wing 14. As shown in FIG. 3A, the propeller duct 38 also includes an internal surface geometry 43 configured to increase cruise speeds by expanding incoming airflow and reducing airflow velocity. Again referring to FIGS. 3 and 5, the housing 39 also includes a forward air inlet opening 39c, adjacent to which is mounted the propeller 36 as described above. An aft end 39d of the housing 39 includes a trailing edge 39e that extends spanwise almost a full length of the housing 39 and aerodynamically merges to skin 22 of the wing 14.

With specific reference to FIGS. 3 and 3A, the housing 39 is mounted on the structural ring 46 via any conventional mounting means, such as by bolting, riveting, or bonding. The structural ring 46 encircles the propeller 36 and maintains the concentricity of the housing 39 relative to the propeller 36. The structural ring 46 also maintains a desired clearance 41 from the propeller tips 36a, as shown in FIG. 3A. The clearance 41 is configured to ensure optimal operating conditions, and typically is about 1% of a diameter of the propeller 36.

Now referring to FIGS. 3 and 4, the structural ring 46 includes a length to sufficiently shroud the propeller 36 fore-to-aft, and more preferably slightly longer than the fore-to-aft length of the propeller 36, as represented by arrow 47. In addition, the structural ring 46 is sufficiently rigid to maintain performance requirements as stated above. The structural ring 46 may comprise ultra-stiff composites, for example carbon or boron fibers. Positioned at spaced apart points along a circumference of the structural ring 46 are a plurality of attachment points or laterally spaced structural tabs 48. Each structural tab 48 includes a thickness equal to, or about equal to, a thickness of the structural ring 46. Additionally, each structural tab 48 is preferably molded or formed as part of the structural ring 46 to provide sufficient strength and rigidity to maintain connection of the structural ring 46 to the wing 14 under the above-mentioned loads. The structural tabs 48 will be further discussed later.

With further reference to FIG. 3A, the structural ring 46 also comprises an inner layer of a sound absorbing, acoustic lining 45. For example, the acoustic lining 45 may be disposed around the inner peripheral of the ring 46 and may be a conventional type of single or double layered acoustic lining 45 used in turbofan jet engines, or other type of acoustic lining 45. More specifically, the acoustic lining 45 surrounds outermost tips 36a of the propeller 36. The acoustic lining 45 includes a layer in the form of a perforated sheet of aluminum.

The acoustic lining 45 absorbs noise generated within the interior of the propeller duct 38. As will be appreciated, the propeller 36 includes the blades 42, as shown in FIG. 3, that rotate about the central axis of the engine 33 during operation of the engine 33, and that produce sound waves (i.e. noise) from the propeller tips 36a. Rotation of the blades 42 serves to draw airflow into the engine 33. Sound waves generated by airflow of the engine 33 and by the propeller tips 36a are absorbed by the lining 45.

Referring to FIGS. 3-5B, the diagonal rods 50 are configured to provide a means of securing the propeller duct 38 to the wing 14. The diagonal rods 50 form a plurality of structural tie rods that couple the propeller duct 38 to the wing 14. Each structural tie rod 50 attaches to one of the plurality of structural tabs 48 of the structural ring 46 via a coupling device (not shown) and secures the propeller duct 38 to the wing 14. For example, the coupling device may comprise a standard lug mount. Referring to FIGS. 2 and 4, using a first pair of lug mounts (not shown), first and second structural tie rods 50a link first and second structural tabs 48a of the structural ring 46 to the rear spar 24 atop of the wing 14. Additionally, third and fourth structural tabs 48b link the propeller duct 38 to the front spar 18 of the wing 14 via a second pair of lug mounts (not shown). Using a third pair of lug mounts (not shown), third and fourth structural tie rods 50b couple fifth and sixth structural tabs 48c to the rear spar 24 beneath the wing 14. Each structural tie rod 50 transmits propeller duct loads arising from internal and external drag, and inertial force conditions, to the wing 14. Since the propeller duct 38 is independently coupled to the wing 14, the structural tie rods 50 allow a direct transmission for shorter load paths to the wing 14.

As the structural ring 46 is directly coupled to the wing 14 via the third and fourth structural tabs 48b, a portion of the wing 14 is notched out as far back as the front spar 18 as shown in FIG. 3. Additionally, the housing 39 may comprise other attachment points (not shown) that are added between the front and rear spars 18, 24. The other attachment points may aid the propeller duct 38 in even better absorbing the primary load and/or any secondary loads.

Another significant benefit that can be realized by incorporating the duct 38 is forming the internal geometry of the duct 38 to expand the incoming airflow into the engine 33 during flight, much as like what is presently done with turbofan engines. This is important because with turboprop engines, as the forward speed of the aircraft increases, the rotational speed of the propeller 36 must also increase. The speed of the propeller tip 36a becomes a key factor in this progression when the speed of the propeller tips 36a nears Mach 1 (i.e., the speed of sound). For propeller tips 36a operating in open air (i.e., without being surrounded by any form of shroud or ducting), large efficiency losses are encountered at this speed range. The efficiency losses effectively limit the maximum economical cruising speed of the aircraft.

In practice, today's turboprop aircraft cruise at speeds in the range of about 0.4 Mach-0.6 Mach. Turbofans can economically cruise at up to 0.8 Mach or even greater. The same type of internal duct geometry as used with present day turbofans could easily be used with the duct 38 to expand incoming airflow, and thus reduce the velocity of the incoming airflow as it encounters the propeller 36. This will allow higher cruise speeds than that obtained by conventional turboprops to be achieved without encountering the above-described Mach problems. While the aircraft cruise speeds attainable with a ducted propeller may not as great as with a conventional turbofan engine, cruise speeds would be higher than what could be achieved with a conventional un-shrouded turboprop engine.

Referring to FIGS. 1, 3 and 4, another aspect of the present disclosure includes the propeller duct 38 having a conventional inlet guide vane 78. The inlet guide vane 78 guides the incoming airflow before it strikes the propeller 36. The inlet guide vane 78 may include a plurality of radial struts 79 from a diameter within the inlet guide vane 78 to a point along a circumference of the inlet guide vane 78. As shown in FIGS. 1, 3 and 4, the inlet guide vane 78 is conventionally mounted ahead of the propeller 36 and within the propeller duct 38 and received by the bearing that supports the propeller 36. Additionally, the inlet guide vane 78 is conventionally mounted to the forward air inlet opening 39c of the propeller duct 38. Dimensions of the inlet guide vane 78 will vary from one application to another depending on the physical dimensions of the flow intake and flow passages as well as fluid flow conditions throughout exterior fluid flow and inlet passages.

Figure 6:
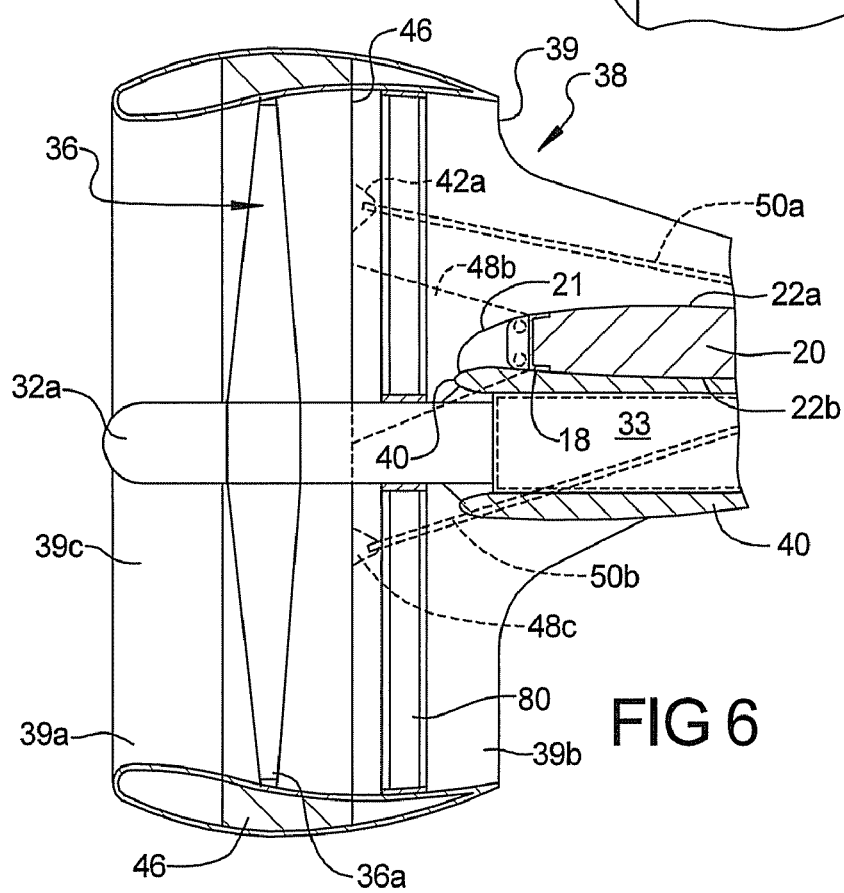
FIG. 6 is a cross-sectional side view of another aspect of the aircraft installation apparatus of FIG. 1.

Referring to FIG. 6, still another aspect of the present disclosure includes the propeller duct 38 further comprising a conventional stator 80. The stator 80 may alternatively be used instead of the inlet guide vane 78 (see FIG. 5). Additionally, the stator 80 is conventionally mounted aft of the propeller 36 and received by the drive shaft 32a that supports the propeller, and before the engine nacelle 34 with all remaining parts being the same. The stator 80 directs airflow from the propeller 36. The stator 80 ensures efficiency by eliminating any rotation of airflow.

The apparatus and method of the present disclosure provides a means of reducing much of the noise related to the vortices around each propeller tip 36a, and any other noise from the propeller 36, by surrounding the propeller 36 with the aerodynamic duct 38 that is coupled independently to the wing 14 of the aircraft 10, rather than the engine nacelle 34. In addition to noise attenuation provided by the sound-absorbing lining 45, the contour of the duct 38 further aids in reducing noise. In particular, the duct 38 restricts the formation of vortices at the propeller tips 36a and physically shields this noise and any other noise from leaving the duct 38. A further advantage is that any first or secondary loads imposed on the propeller duct 38 are transmitted directly to the wing 14 instead of the engine nacelle 34, which allows the engine nacelle 34 to be made less robust and with a reduced weight.

While various embodiments have been described, those skilled in the art will recognize modifications or variations that might be made without departing from the inventive concept. The examples illustrate the apparatus and method and are not intended to limit it. Therefore, the description and claims should be interpreted liberally with only such limitation as is necessary in view of the pertinent prior art.

What is claimed is:

1. An aircraft power plant installation apparatus comprising:
   a power plant mounted to a wing of a mobile platform and having a propeller;
   a propeller duct fully shrouding the propeller for attenuating noise generated by the propeller; and
   a securing system supporting the duct from the wing comprising a plurality of mounts spaced circumferentially about the propeller duct to secure the duct to at least one spar of the wing.

2. The aircraft power plant installation apparatus of claim 1, wherein at least one of the plurality of mounts is secured to a front spar of the wing.

3. The aircraft power plant installation apparatus of claim 1, wherein at least one of the plurality of mounts is secured to a rear spar of the wing.

4. The aircraft power plant installation apparatus of claim 1, wherein the power plant is mounted beneath the wing of the mobile platform.

5. The aircraft power plant installation apparatus of claim 1, wherein the duct comprises a generally rigid structural ring fully shrouding the propeller.

6. The aircraft power plant installation apparatus of claim 1, wherein the duct further comprises an inlet guide vane assembly mounted adjacent to the propeller and secured to a peripheral edge of the propeller duct.

7. The aircraft power plant installation apparatus of claim 1, wherein the duct further comprises a stator vane mounted adjacent to the propeller and secured to a peripheral edge of the propeller duct.

8. The aircraft power plant installation apparatus of claim 1, wherein the duct comprises a surface having an inner layer of sound-absorbing material to attenuate noise caused by the propeller while operating the propeller.

9. The aircraft power plant installation apparatus of claim 1, wherein the duct comprises an internal surface geometry configured to increase cruise speeds by expanding incoming airflow and reducing airflow velocity experienced by the propeller.

10. A structure for shrouding a propeller of a turboprop engine used with a mobile platform, the structure comprising:
a propeller duct having a tapering aerodynamic shape that forms a shroud for said engine;
a circumferential ring supported within said propeller duct so as to closely circumscribe a plurality of outermost tips of said propeller;
said circumferential ring including a surface, with said surface including sound attenuating material secured thereto for attenuating noise generated by vortices created at said outermost tips of said propeller during operation of said engine; and
a plurality of circumferentially spaced apart structural mounts for supporting said propeller duct from a portion of said mobile platform, wherein at least a pair of said structural mounts is adapted to directly couple to at least one spar of a mobile platform wing.

11. The structure of claim 10, further comprising:
a plurality of structural rods coupled at one end to said structural mounts, and at an opposite end coupled to a front spar of said mobile platform.

12. The structure of claim 10, further comprising a plurality of structural rods coupled at one end to said circumferential ring, and at an opposite end coupled to a rear spar of said mobile platform.

13. The structure of claim 10, wherein the propeller duct has an internal surface geometry configured to increase cruise speeds by expanding incoming airflow and reducing airflow velocity experienced by the propeller.

14. A method for attenuating noise generated by a plurality of blades of a propeller of a turboprop engine, comprising:
forming an aerodynamic duct that encloses said propeller;
within said aerodynamic duct, fixedly supporting a circumferential ring having a sound attenuating quality that closely surrounds outermost tips of said propeller blades, to attenuate noise associated with vortices created at the outermost tips of said propeller,
the circumferential ring having a plurality of laterally spaced structural mounts adapted to secure the circumferential ring to at least one spar with a wing of a mobile platform; and
coupling said structural elements to the at least one spar of the wing.

15. The method of claim 14, wherein fixedly supporting a circumferential ring comprises supporting a circumferential ring formed from a structurally rigid material, and securing at least one layer of sound attenuating material to a surface of said structurally rigid material.

16. The method of claim 14, wherein forming the aerodynamic duct comprises forming a duct that includes an internal surface geometry configured to increase cruise speeds by expanding incoming airflow and reducing airflow velocity experienced by the propeller.

17. The method of claim 14, wherein coupling said structural elements to the at least one spar further comprises securing said structural elements to a rear spar of the wing via a structural rod.

18. The method of claim 14, wherein coupling said structural elements to the at least one spar further comprises securing said structural elements directly to a front spar of the wing.

* * * * *